United States Patent [19]
Dietrich et al.

[11] 3,922,351
[45] Nov. 25, 1975

[54] ENHANCEMENT OF FLAVOR WITH 2,5,5-TRIMETHYL-HEPTA-2,6-DIENAL AND LOWER ALKYL ACETALS THEREOF

[75] Inventors: Paul Dietrich, Chene-Bourg-Geneva; Alan F. Thomas, Bernex-Geneva, both of Switzerland; William P. Clinton, Monsey; Thomas H. Parliment, Valley Cottage, both of N.Y.

[73] Assignee: General Foods Corporation, White Plains, N.Y.

[22] Filed: Oct. 12, 1972

[21] Appl. No.: 297,103

[52] U.S. Cl.......... 426/534; 260/601 R; 260/615 A; 426/594

[51] Int. Cl.............................................. A23l 1/26

[58] Field of Search ........................................ 426/65

[56] References Cited
UNITED STATES PATENTS

| | | | |
|---|---|---|---|
| 3,702,253 | 11/1972 | Winter et al........................... | 426/65 |
| 3,767,429 | 10/1973 | Burke .................................... | 426/65 |

Primary Examiner—Joseph M. Golian
Attorney, Agent, or Firm—Daniel J. Donovan

[57] ABSTRACT

A new aldehyde, 2,5,5-trimethyl-hepta-2,6-dienal and acetals thereof having a woody taste and flavor, and useful for enhancement of coffee flavored foodstuffs. The enhancement is achieved by the addition of a small but effective amount of said aldehyde or acetals thereof.

10 Claims, No Drawings

ENHANCEMENT OF FLAVOR WITH 2,5,5-TRIMETHYL-HEPTA-2,6-DIENAL AND LOWER ALKYL ACETALS THEREOF

BACKGROUND OF THE INVENTION

The present invention relates to 2,5,5-trimethyl-hepta-2,6-dienal and certain acetals thereof, found useful in the area of flavor alteration whether by enhancement of flavor characteristics in a substance, modification of flavor or by complete or partial masking of flavor. Still more particularly, the invention relates to incorporation of woody flavor compounds selected from the group consisting of 2,5,5-trimethyl-hepta-2,6-dienal, its acetals and mixtures thereof in coffee to reduce the caramel, acid, and sour flavor of coffee; modify and improve the green, earthy, and buttery notes of coffee; and add a desirable woody, regular coffee flavor to the foodstuff. The compounds employed have particular application to soluble and regular coffee which may be deficient in a woody flavor.

DESCRIPTION OF THE PRIOR ART

In the field of flavor enhancement, it has been general practice to employ synthetic and naturally isolated compounds and compositions to enhance or mask the flavor of foodstuffs. Generally, isolation of single flavors does not allow one to predict equivalent flavors since compounds of greatly differing structure have been found to produce approximately the same flavor character while compounds of similar structure frequently differ appreciably in taste. Consequently, the identification of desirable flavor components requires synthesis and trial of individual candidates until compounds are identified which have desirable flavors.

For many years, coffee technologists have searched for flavor enhancing compounds which would produce the flavor note generally described by coffee experts as "woody." Recently, a number of woody flavored 2-nonenals and 2-nonenols have been identified to have this character. In the course of investigating those compounds, we have discovered the compounds employed in the composition and process of this invention.

SUMMARY OF THE INVENTION

The general purpose of this invention is to provide compounds and compositions containing compounds which will enhance coffee flavored foodstuffs by imparting to them a regular coffee flavor characterized by experts as "woody."

The flavor enhancement is achieved by the addition of a small but effective amount of woody flavored compounds selected from the group of 2,5,5-trimethyl-hepta-2,6-dienal and the acetals derived therefrom to the foodstuff to be flavored. The compounds, singly or mixtures, produce a coffee flavor when added in minute amount, generally in parts per billion, to water or foodstuffs.

It is an object of this invention to provide compounds for the flavor alteration of foodstuffs, particularly coffee deficient in woody flavor.

It is a further object of this invention to describe processes for employing woody compounds in concentrates useful for enhancing the flavor of foodstuffs, particularly coffee.

DESCRIPTION OF THE INVENTION

The compounds employed in this invention are 2,5,5-trimethyl-hepta-2,6-dienal and acetals prepared therefrom which when added to foods, particularly coffee, produce a flavor characterized by coffee experts as woody. These woody flavored compounds are characterized by the following formulas:

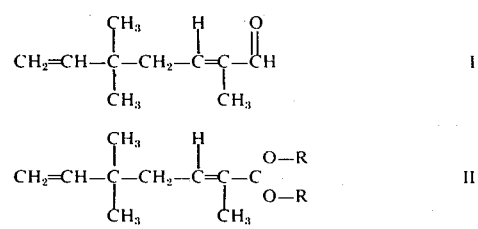

Wherein R is preferably lower alkyl, particularly methyl.

The 2,5,5-trimethyl-hepta-2,6-dienal is prepared by oxidizing 2,5,5-trimethyl-hepta-2,6-diene with selenium dioxide. The 2,5,5-trimethyl-hepta-2,6-diene is prepared by reacting 1-chloro-3-methyl-2-butene with magnesium in ether following the method of Henne, et al. J.A.C.S. 63, 3474 (1941). The 1-chloro-3-methyl-2-butene is prepared according to the procedure of Jones and Chorley, J.C.S. 832 (1946). Alternatively, 2,5,5-trimethyl-hepta-2,6-diene is prepared by the Wurtz reaction using magnisum and phenyl chloride (isoprene and hydrochloric acid) in ether J.Am. Chem. Soc., 76, 5403 (1954).

The compounds of Formula II are prepared by reacting the selected compound of Formula I with a trialkylorthoformate, and alkanol and an acid catalyst such as ammonium chloride.

Representative of the woody compound of this invention are 2,5,5-trimethyl-hepta-2,6-diene dimethyl acetal, 2,5,5-trimethyl-hepta-2,6-dienal, 2,5,5-trimethyl-hepta-2,6-diene diethyl acetal and the like.

The compounds for Formulas I and II are useful for enhancing the flavor of food. They enhance coffee flavored foodstuffs where a regular coffee flavor generally characterized by coffee experts as woody is desired but deficient—such as regular coffees like Robustas, decaffeinated coffee, soluble coffee; and coffee flavored foods such as icings, drinks, Postum brand beverage, desserts, candies, and the like.

The Compounds of Formulas I and II and mixtures thereof give coffee flavor when added to water or foodstuffs. In addition to imparting to coffee a regular, coffee-like flavor having a strong woody note, these compounds exert a balancing effect on other desirable coffee notes such as the green, earthy, and buttery flavors while masking the undesirable acid, sour, and caramel flavors. The compounds also exert a blending effect on the overall brew flavor of soluble coffee. The compounds of Formulas I and II may be added to any coffee including soluble coffee, decaffeinated coffee either regular or soluble and regular roasted and ground coffee. The compounds of Formulas I and II may also be incorporated with other coffee flavor fractions, both synthetic and those obtained from coffee, and with these flavors exert a balancing effect while strengthening the woody regular coffee flavor.

Depending on the flavor desired, the comounds of Formulas I and II can be incorporated in the foodstuff either alone, combined with other flavor ingredients, or with carriers. In flavoring soluble coffee, the woody compounds may be either added to regular coffee prior to extraction, to coffee percolate prior to drying, or may be plated on or mixed with the dried coffee. Since only a minute amount of the flavor and aroma compounds are needed, it is preferred to incorporate them in an edible carrier or concentrate prior to addition to the coffee. The concentrate or carrier may be liquid, syrup, or solid, depending on its ultimate use. For example, the compounds of Formulas I and II may be incorporated in ethanol, propylene glycol; oils such as cottonseed, coffee, peanut, or the like; or other edible vehicles to form a concentrate for convenient shipping, storage, and addition to the foodstuff. For example, oil containing a compound of Formulas I and II or mixtures thereof may be plated on soluble coffee to enhance its flavor or alternatively, an oil containing the flavor compound may be incorporated in extract and dried. Dry concentrates containing the compounds of Formulas I and II or mixtures thereof may also be prepared by employing film-forming compositions such as gums—like gum arabic, pectins, alginates, and the like; starch breakdown products such as Capsul (National Starch), Morex 1918 (Corn Products), Maltrin 10 (Grain Processing), and the like; candy melt systems and other art-recognized stabilizing or diluent systems. In forming any concentrate, the proportions of the compounds of Formulas I and II therein is not critical provided the level of flavoring is controlled to give an enhanced coffee flavor and an even distribution of the flavor concentrate throughout the foodstuff to be flavored.

Minute amounts of the compounds of Formulas I and II are sufficient to produce an enhancement of coffee flavor in foodstuffs. For example, in regular or soluble coffee beverages, say from about 1 to 1.5% coffee solids, the compounds can be employed to produce a change in cup flavor and aroma but a change which cannot be described as a particular flavor. Alternatively, proportions sufficient to be recognized as woody may be employed. The threshold flavor level for the compounds of this invention is about 20 ppb with a woody flavor evident at about 80 ppb. At 2 ppm the flavor of the compounds change and become aromatic and not desirable for coffee flavoring.

The flavor impact of the compounds of Formulas I and II and mixtures thereof is easily adjusted by varying the concentration of the flavoring compounds employed in the foodstuff. It is to be expected that adjustment will be necessary depending on the particular foodstuffs being flavored. Initial panel screening by those of ordinary skill in the art is used to determine the threshold and proper strength level for the particular foodstuff in which the flavor is employed.

The compounds of Formulas I and II are particularly useful for balancing the natural flavor of spray-dried and freeze dried soluble coffee, decaffeinated coffee, both soluble and regular, and regular coffee of various blends or single varieties, particularly those having high Robusta content. The flavor compounds are particularly preferred for imparting a woody flavor to the preceding coffees deficient, partially or totally, in that flavor. However, even at levels below the woody threshold level, balancing of flavor is noted by expert tasters. The flavor compounds of Formulas I and II are also particularly useful when combined with steam-generated natural coffee aromas or enhancers where there is produced a blending or smoothing of coffee aroma and flavor and a masking of the undesirable sourness and caramel characteristics often associated with coffee. Similar improvement is noted for mixtures of synthetic and natural coffee aromas and flavors. In addition to the application of the compounds of Formulas I and II in foodstuffs, these flavoring agents may also be employed in edible substances such as pharmaceuticals, where a woody regular coffee note is desired.

The invention is now illustrated but not limited by the following examples:

EXAMPLE I

A solution of 2,5,5-trimethyl-hepta-2,6-diene (68 g, 0.5 mole) in ethanol (75 ml) is heated to 50°C. A solution of selenium dioxide (28 g, 0.25 mole) in warm ethanol (45 ml) is added over a 15-minute period in a nitrogen atmosphere. The resulting mixture is heated to reflux or 45 minutes. The solution is cooled and the selenium removed by filtration. The filtrate is concentrated and distilled to give a mixture of 2,5,5-trimethyl-hepta-2,6-dienal and its corresponding alcohol (2,5,5-trimethyl-hepta-2,6-dienol, b.p. 94°C/10 mm). The mixture is redistilled using a spinning band column to give 2,5,5-trimethyl-hepta-2,6-dienal, b.p. 70°C/13 mm.

To obtain a maximum yield of the aldehyde, the mixture of aldehyde and alcohol is treated with activated manganese dioxide to convert the alcohol to the aldehyde.

EXAMPLE II 2,5,5-trimethyl-hepta-2,6-dienal (10.9 g, 0.5 mole), trimethyl orthoformate (10.6 g, 0.1 mole), methyl alcohol (10 ml), and ammonium chloride (0.5 g) are heated at reflux for 3 hours under nitrogen. The mixture is cooled, filtered, diluted with water and extracted with ether. The ether layer is washed with 5% sodium bicarbonate followed by water and dried over sodium sulfate. The ether solution is concentrated and distilled under vacuum to give 2,5,5-trimethyl-hepta-2,6-diene dimethyl acetal.

When the methyl alcohol is replaced by ehtanol and the trimethyl orthoformate replaced by triethyl orthoformate, 2,5,5-trimethyl-hepta-2,6-diene diethyl acetal is obtained.

EXAMPLE III

A mixture of 0.02 mol. (3.1 g) of 2,5,5-trimethyl-hepta-2,6-dienal, 0.02 mol. of triethyl orthoformate and 0.46 ml of ethyl alcohol were stirred at room temperature in a bath of cold water. On the addition of 2 drops of boron trifluoride etherate the temperature rose to about 45°, falling almost at once to room temperature, at which the mixture was stirred for 17 hours. About 1.5 g of anhydrous potassium carbonate was added, the mixture was stirred for 10 minutes more, filtered and concentrated. Rapid distillation gave a fraction consisting mainly of the desired acetal, which was purified by further distillation to yield 2,5,5-trimethyl-hepta-2,6-dienal diethyl acetal b.p. 95°–96°C/10 mm.

When trimethyl orthoformate and methyl alcohol are substituted for their ethyl homologs there is obtained 2,5,5-trimethyl-hepta-2,6-dienal dimethyl acetal b.p. 71°C/10 mm.

EXAMPLE IV

Roasted coffee extract is prepared from roasted coffee by normal commercial techniques to obtain a percolate of 15–50% coffee soluble solids. Sufficient 2,5,5-trimethyl-hepta-2,6-dienal is added to give a woody, natural coffee flavor at 1.35% coffee solids in aqueous solution. The mixture is placed in cooled trays and frozen at a thickness of less than one-half inch. A frozen mixture of extract and aroma is then freeze dried in a commercial drying unit to produce a freeze dried coffee having enhanced woody flavor.

Instead of freeze drying the enhanced percolate, it may be spray dried instead. If desired, a portion of the percolate may be employed to fix the flavor compound by any known drying procedure and then mixed with unenhanced dried soluble coffee.

What is claimed is:

1. A process for enhancing the flavor of foodstuffs comprising adding thereto a compound selected from the group consisting of 2,5,5-trimethyl-hepta-2,6-dienal, lower alkyl acetals of 2,5,5-trimethyl-hepta-2,6-dienal and mixtures thereof in an amount effective to impart a woody flavor to the foodstuff.

2. The process of claim 1 in which the foodstuff is coffee.

3. The process of claim 2 in which the coffee is decaffeinated.

4. The process of claim 2 in which the coffee is roasted coffee.

5. The process of claim 2 in which the coffee is soluble coffee.

6. The process of claim 2 in which the compound is 2,5,5-trimethyl-hepta-2,6-dienal.

7. The process of claim 6 in which the coffee is soluble coffee.

8. The process of claim 7 in which the soluble coffee is deficient in a woody flavor.

9. A foodstuff having as an active flavoring ingredient an amount of compound selected from the group consisting of 2,5,5-trimethyl-hepta-2,6-dienal, lower alkyl acetals of 2,5,5-trimethyl-hepta-2,6-dienal and mixtures thereof effective to impart a woody flavor to the foodstuff.

10. The foodstuff of claim 9 wherein the foodstuff is coffee deficient in woody flavor.

* * * * *